United States Patent
Hoffman et al.

(10) Patent No.: US 10,612,473 B2
(45) Date of Patent: Apr. 7, 2020

(54) METHOD AND SYSTEM FOR CONTROLLING A VEHICLE PROPULSION SYSTEM BASED UPON AN ADJUSTED CLUTCH TORQUE CAPACITY

(71) Applicant: GM GLOBAL TECHNOLOGY OPERATIONS LLC, Detroit, MI (US)

(72) Inventors: Shaun D. Hoffman, West Bloomfield, MI (US); Jameson M. Collins, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 15/879,484

(22) Filed: Jan. 25, 2018

(65) Prior Publication Data
US 2019/0226409 A1 Jul. 25, 2019

(51) Int. Cl.
| | | |
|---|---|---|
| *B60W 30/18* | (2012.01) |
| *F02D 11/10* | (2006.01) |
| *F02D 41/02* | (2006.01) |
| *F02D 41/00* | (2006.01) |
| *F02D 29/02* | (2006.01) |

(52) U.S. Cl.
CPC ............ *F02D 11/105* (2013.01); *F02D 29/02* (2013.01); *F02D 41/0097* (2013.01); *F02D 41/02* (2013.01); *F02D 41/022* (2013.01); *F02D 41/023* (2013.01); *F02D 2200/101* (2013.01); *F02D 2200/1012* (2013.01)

(58) Field of Classification Search
CPC ..... F16D 2500/3066; F16D 2500/3065; F16D 2500/7044; F16D 2500/70252; Y10T 477/70; Y10T 477/6403; F16H 61/061; F02D 11/105; F02D 41/022; F02D 41/023; F02D 29/02; F02D 41/0097; F02D 41/02; F02D 2200/101; F02D 2200/1012
See application file for complete search history.

(56) References Cited

U.S. PATENT DOCUMENTS

| | | | |
|---|---|---|---|
| 8,033,957 B2 * | 10/2011 | Minami | F16D 48/06 477/180 |
| 8,414,449 B2 | 4/2013 | Heap et al. | |
| 8,996,266 B2 | 3/2015 | Hultengren et al. | |
| 9,002,606 B1 | 4/2015 | Hawkins et al. | |
| 9,140,359 B2 | 9/2015 | Porto et al. | |

(Continued)

*Primary Examiner* — Jacob S. Scott
*Assistant Examiner* — Lillian T Nguyen

(57) ABSTRACT

A vehicle propulsion system includes a transmission having manually selectable gear ratios, a manually operable clutch for selectively connecting the transmission to an engine for receiving torque from the engine and transmitting that torque through the transmission for propelling the vehicle, a clutch position sensor that generates a clutch position signal and a controller that is programmed to receive the clutch position signal, determine an actual engine output torque, determine an actual clutch torque capacity value based upon the actual engine output torque and the clutch position signal, determine a difference between the actual clutch torque capacity value and a clutch torque capacity from a torque to position table corresponding to the clutch position signal, determine an adjusted clutch torque capacity based upon the determined difference, and control an operation of the engine based upon the adjusted clutch torque capacity.

14 Claims, 5 Drawing Sheets

(56) References Cited

U.S. PATENT DOCUMENTS

| | | |
|---|---|---|
| 9,365,197 B2 | 6/2016 | Ward |
| 9,416,874 B2 | 8/2016 | Vu et al. |
| 9,670,857 B2 | 6/2017 | Kar et al. |
| 2015/0175004 A1* | 6/2015 | Yasunaga ............... B60K 35/00 340/441 |
| 2017/0051695 A1* | 2/2017 | Kar ....................... F02D 41/022 |
| 2018/0244261 A1* | 8/2018 | Ruybal ................. B60W 20/40 |

* cited by examiner

METHOD AND SYSTEM FOR CONTROLLING A VEHICLE PROPULSION SYSTEM BASED UPON AN ADJUSTED CLUTCH TORQUE CAPACITY

FIELD

The present disclosure relates to a method and system for controlling a vehicle propulsion system based upon an adjusted clutch torque capacity. In particular, the present disclosure relates to a method and system for controlling a vehicle propulsion system having a manually operated transmission based upon an adjusted clutch torque capacity.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Various prime movers, such as, for example, internal combustion engines, electric motors, and/or fuel cells, can be employed to power vehicles. Modern internal combustion engines typically employ an engine control module (ECM) to control the operation of the engine. When vehicle propulsion systems include an automatic transmission, the ECM may communicate with a transmission control module (TCM) to coordinate operation of components, such as one or more clutches, within the automatic transmission.

In a vehicle propulsion system as described in co-assigned, U.S. Pat. No. 8,996,266, the disclosure of which is hereby incorporated herein in its entirety, a TCM and an ECM may work together during vehicle launch to calculate and modify over time a position control signal that is then used for controlling a position of a clutch. The position signal commands an apply position of the clutch. The goal being to have a smooth and consistent feel during a vehicle launch. The method disclosed there provides position control over a clutch during a launch. A torque to position (TTP) table which relates a torque capacity of the clutch to an apply position of a clutch actuator may be used by the TCM to determine precisely how much torque to command for a given clutch actuator position and vice-versa. This disclosure also describes how the TTP table may be modified and/or adapted over time based upon a difference between a commanded clutch torque from the TCM and a calculated clutch torque that may be derived based upon engine torque, engine acceleration, and inertia. In this manner, control over the apply position of the clutch may be adapted to improve vehicle launch.

Similarly, other vehicle propulsion systems which include an automatic or automated transmission may control gear ratio changes, rev-matching, vehicle creep management, and the like by controlling the clutch apply position based upon a reference to a torque to position table. For example, co-assigned, U.S. Pat. No. 9,002,606, the disclosure of which is incorporated herein in its entirety, discloses a method and system for continually adjusting a bite point of an input clutch of an automated transmission to minimize the time it takes for a vehicle to creep after a brake applier, such as a brake pedal, is released.

Other vehicle propulsion systems employ manually operated transmissions for transmitting engine torque to driven wheels. Such manual transmissions are generally characterized by gear ratios that are selectable by locking selected gear pairs to the output shaft inside the transmission. A vehicle using such a manual transmission may employ a manually operable clutch for regulating torque transfer from the vehicle's engine to its transmission. Commonly, such a clutch is manually operated by a foot pedal in order to disconnect the vehicle's engine from its transmission and permit starting the vehicle from rest, as well as to facilitate selection of the transmission gear ratios when the vehicle is in motion. The actual selection of the gear ratios inside the manual transmission is typically accomplished via a shift lever movable by the vehicle operator.

Co-assigned, U.S. Pat. No. 9,365,197, the disclosure of which is hereby incorporated herein in its entirety, discloses a method and system for vehicle launch control based upon, among other things, a clutch pedal position signal from a clutch pedal position sensor. In particular, the method and system of this disclosure applies a brake to a non-driven wheel until the clutch pedal position signal exceeds a predetermined threshold that corresponds substantially to an initially determined clutch engagement position.

Similarly, co-assigned, U.S. Pat. No. 9,670,857, the disclosure of which is hereby incorporated herein in its entirety, discloses a method of controlling torque output from a prime mover during a vehicle launch for a vehicle propulsion system including a manual transmission. The method varies the prime mover torque based upon clutch pedal position and throttle position.

Coordination of the operation of a prime mover, which may be controlled by an ECM, with a manual transmission having a manually operable clutch may be challenging. Conventional vehicle propulsion systems have little to no knowledge about the actual torque capacity of the manually operable clutch. Torque carrying capacity may be initially determined for a limited number of clutch pedal positions, such as, for example, clutch pedal bottom of travel, clutch engagement position, (and/or "bite" point) and clutch pedal top of travel. However, the torque capacity of a clutch in relation to these pedal positions may change as the clutch wears, thus, the torque to position of the clutch also changes. Further, to correct for wear, some manually operable clutches include automatic adjustment mechanisms which may also cause the torque carrying capacity of the clutch for any given pedal position to change. Thus, the accuracy of an initially determined torque carrying capacity may become degraded.

SUMMARY

In an exemplary aspect, a vehicle propulsion system includes a transmission having manually selectable gear ratios, a manually operable clutch for selectively connecting the transmission to an engine for receiving torque from the engine and transmitting that torque through the transmission for propelling the vehicle, a clutch position sensor that generates a clutch position signal and a controller that is programmed to receive the clutch position signal, determine an actual engine output torque, determine an actual clutch torque capacity value based upon the actual engine output torque and the clutch position signal, determine a difference between the actual clutch torque capacity value and a clutch torque capacity from a torque to position table corresponding to the clutch position signal, determine an adjusted clutch torque capacity based upon the determined difference, and control an operation of the engine based upon the adjusted clutch torque capacity.

In another exemplary embodiment the system further includes an engine speed sensor that outputs an engine speed signal on an input side of the manually operable clutch, a transmission output speed sensor on an output side of the manually operable clutch that outputs a transmission output speed signal and the controller is further programmed to receive the engine speed signal, receive the transmission output speed signal, determine a ratio between the engine speed signal and the transmission output speed signal, and determine if the ratio between the engine speed signal and the transmission output speed signal exceeds a predetermined threshold where the controller is programmed to determine the actual engine output torque when the ratio exceeds the predetermined threshold.

In another exemplary embodiment, the controller is further programmed to store a diagnostic code if the difference between the actual clutch torque capacity value and a clutch torque capacity from a torque to position table corresponding to the clutch position signal exceeds a predetermined threshold.

In another exemplary embodiment, the controller is further programmed to determine whether the vehicle propulsion system is experiencing a transient condition and the controller does not determine an adjusted torque capacity during a transient condition.

In another exemplary embodiment, the controller is further programmed to determine a rate of change of engine torque, and determine whether the rate of change of engine torque exceeds a predetermined threshold and the controller determines that the vehicle propulsion system is experiencing a transient condition when the rate of change of engine torque exceeds the predetermined threshold.

In this manner, control of a vehicle propulsion system may be better controlled in response to changes in actual clutch torque capacity in a manually operable clutch for a manual transmission.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
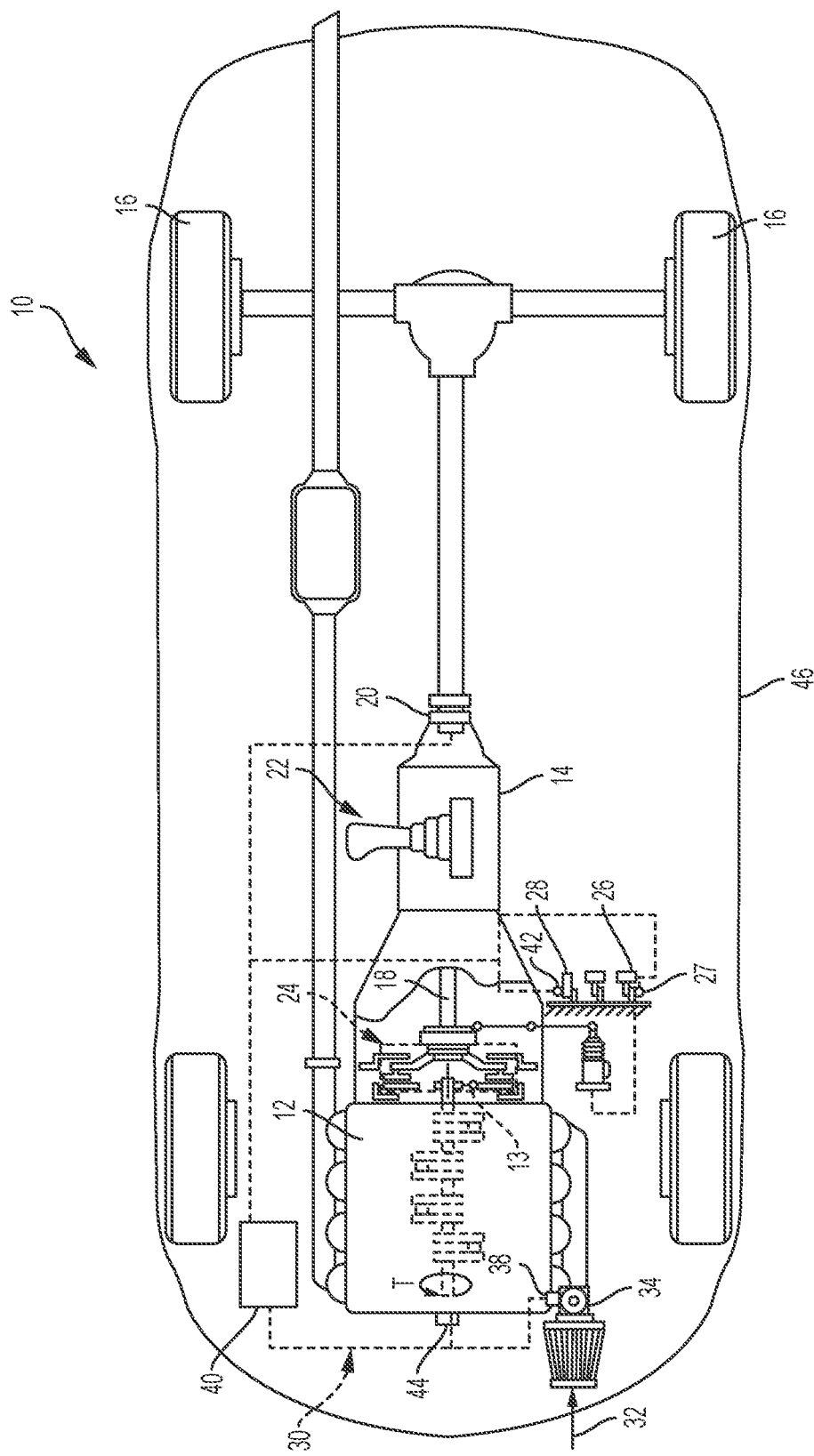
FIG. 1 is a schematic illustration of a vehicle.

Referring to the drawings, wherein like reference numbers refer to like components, FIG. 1 shows a schematic illustration of a vehicle 10. The vehicle 10 includes a prime mover 12. Although the remainder of the present disclosure concentrates on the prime mover 12 being an internal combustion engine, the prime mover may also, for example, be one or more electric motors, or a hybrid-electric device including the engine, a fuel cell, and/or one or more such electric motors.

The internal combustion engine generally includes a crankshaft 13 operatively connected to a manual (i.e., manually operable) transmission 14. The manual transmission 14 is configured to receive engine output torque T from a crankshaft 13 and transmit the torque to the drive wheels 16. The subject engine may be, for example, a spark-ignition, i.e., gasoline, internal combustion engine, or a compression-ignition, i.e., diesel, internal combustion engine. The manual transmission 14 may include a plurality of manually selectable gears (not shown) that are assembled into a gear train and are configured to provide multiple gear ratios between an input shaft 18 and an output shaft 20 of the transmission 14. The gear ratios of the manual transmission 14 are selectable by manually engaging gear pairs between the input shaft 18 and the output shaft 20.

Vehicle 10 also includes a movable shift lever 22 that is mechanically connected to the manual transmission 14. The shift lever 22 is manually operable to selectively engage gear pairs within the transmission and thereby manually select gear ratios. The shift lever 22 may extend into a passenger compartment of the vehicle 10 and is positioned such that an operator or driver of the vehicle 10 may conveniently reach the lever to select desired gear ratios in the manual transmission 14 while operating the vehicle.

The vehicle 10 may also include a manually operable clutch 24 that is operated by the driver for selectively coupling the input shaft 18 of the manual transmission to the prime mover 12 and to regulate torque transfer from prime mover 12, e.g., from the crankshaft 13 of the engine, to the manual transmission 14. Although the vehicle 10 is depicted as having a rear-wheel-drive architecture, nothing precludes the subject vehicle from having other architectures, such as a front- or a four-wheel-drive type.

As understood by those skilled in the art, without the clutch 24, the prime mover 12 and the drive wheels 16 would at all times be continuously linked, and any time the vehicle 10 stopped, the prime mover 12 would stall. Accordingly, a disengaged clutch 24 is beneficial for starting the prime mover 12 in a stationary vehicle 10. Additionally, without the clutch 24, selecting desired gear ratios inside the manual transmission 14 would be challenging, even with the vehicle 10 already in motion, because deselecting a gear while the manual transmission is under load typically requires considerable force. Also, selecting a desired gear ratio in the manual transmission 14 while the vehicle 10 is in motion may require the rotational speed of prime mover 12 to be held at a specific value, which depends on the rotational speed of drive wheels 16, as well as on the desired gear ratio.

As shown, the clutch 24 is operated by the driver of the vehicle via a clutch pedal 26. When the clutch pedal 26 is fully depressed, the clutch 24 is fully disengaged, and none of the output torque T is transferred from the prime mover 12 to the transmission 14, and, therefore, no torque is transferred from the transmission to the drive wheels 16. Thus, when the clutch 24 is disengaged, it is possible to select gear ratios or to stop the vehicle 10 without stopping or stalling the power-plant 12. When the clutch pedal 26 is fully released, the clutch 24 becomes fully engaged, and practically all the output torque T of the prime mover 12 is transferred to the transmission 14. In this fully engaged state, the clutch 24 may act as a rigid coupling such that the output torque Tis transmitted to the drive wheels 16 with minimal loss in operating efficiency. Specific travel of the clutch pedal 26 may be detected via a clutch pedal position sensor 27.

Between the above described extremes of engagement and disengagement, the clutch 24 may slip to varying degrees. When the clutch 24 slips, it still transmits some measure of output torque T despite the difference in speeds between the output of the prime mover 12 and the input to the transmission 14. Because during slippage of the clutch 24, the output torque T is transmitted by means of frictional contact rather than a direct mechanical connection, the fraction of the output torque not used to drive the wheels 16 is absorbed by the clutch and then dissipated to the ambient as heat. When clutch slip is properly applied, such slip allows the vehicle 10 to be started from a standstill, and when the vehicle is already moving, clutch slip allows rotation of the prime mover 12 to gradually adjust to a newly selected gear ratio.

The vehicle 10 also includes an accelerator or throttle pedal 28 configured to facilitate driver control over the prime mover output torque T for propelling the vehicle. The throttle pedal 28 is operatively connected to an actuator 30 operable to submit a driver request for torque from the prime mover 12, such as the internal combustion engine. An electronic control module 40 (ECM) may control operation of the engine through operation of various engine actuators such as, for example, a fuel control actuator 30 which may be configured as, for example, an electronic fuel control (EFC) system. Specifically, the EFC system can be configured to regulate an amount of intake air 32 used by the engine for combustion and thus regulate the output torque T. To achieve desired starting of the vehicle 10 from standstill, as well as gear changes in the transmission 14, the throttle pedal 28 is typically operated by the driver of the vehicle in concert with the clutch pedal 26. However, in situations where low speed vehicle creep is desired, such as in heavy traffic or to adjust vehicle position in a parking space, the clutch pedal 26 may be operated to engage the clutch 24 without using the throttle pedal 28.

For illustrative purposes, in FIG. 1 the prime mover 12 is depicted as a gasoline internal combustion engine having an embodiment of the EFC system that in gasoline engines is generally known as electronic throttle control (ETC). The ETC includes a throttle valve 34 arranged in an air duct upstream of the engine and operative to control an amount of the intake air 32 used by the engine for combustion. As also shown, the ETC includes an electric motor 38 configured to operate the throttle valve 34 and an electronic controller 40 (ECM) configured to regulate operation of the throttle valve based, for example, a request for torque from a driver as may be indicated by a position of the throttle pedal 28. The controller 40 may be an embedded system that employs software to determine the required position of the throttle valve 34 via calculations based on data acquired by various sensors, including a throttle pedal position sensor 42 for sensing the above-noted position of the throttle pedal 28, an engine speed sensor 44, and a vehicle speed sensor. The electric motor 38 is used to open the throttle valve 34 to a desired angle via a closed-loop control algorithm programmed into the controller 40 permitting a specific amount of intake air 32 to enter the engine. Additionally, the controller 40 is programmed to inject a specific amount of fuel, corresponding to the amount of intake air 32, into the engine for generating a desired level of output torque T. As such, the ETC electronically "connects" the throttle pedal 28 to the engine, in place of a mechanical linkage, for driving the vehicle 10.

The controller 40 may be a dedicated controller for the prime mover 12, a controller for the vehicle propulsion system that includes both the prime mover and the manual transmission 14, or a central processing unit for the entire vehicle 10. The controller 40 may include a memory, at least some of which is tangible and non-transitory. Any algorithms required by the controller 40 or accessible thereby may be stored in the memory and automatically executed to provide the required functionality.

U.S. Pat. No. 9,670,857, discloses a vehicle propulsion system which controls the torque of a prime mover for launching a vehicle having a manually operable transmission. In particular, that system varies engine torque based upon a clutch pedal position and a throttle pedal position in which the engine torque is increased after detecting a clutch pedal position which exceeds a predetermined threshold that corresponds to a clutch engagement position. The clutch pedal position which corresponds to a clutch engagement may be empirically identified or calculated. While that disclosure concentrates on adjusting the torque of the engine during a launch, the clutch pedal position is only relied upon for determining whether the clutch is disengaged or not based upon whether the clutch pedal position exceeds a predetermined position or not. The inventors of the present disclosure realize that the actual torque capacity of a clutch is not binary. Rather, the torque capacity of a clutch varies according to the clutch pedal position.

The present disclosure is primarily concerned with controlling the engine in response to changing conditions in a manually operated clutch. The engine control module receives signals from sensors indicating the condition and/or state of the manually operated clutch and, in response, may then adjust the operation of the engine.

Figure 2:
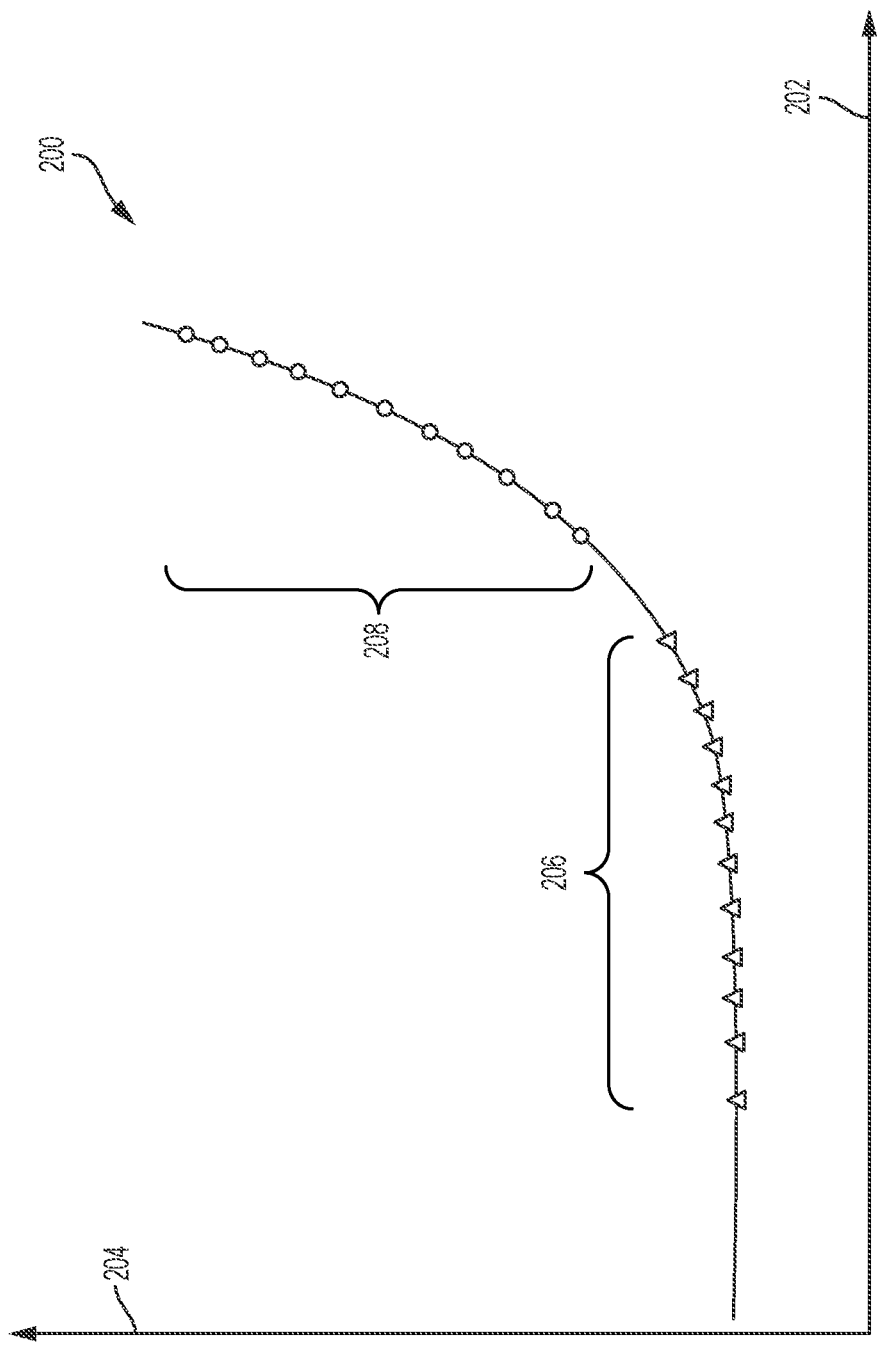
FIG. 2 illustrates an exemplary clutch torque to clutch pedal position curve.

FIG. 2 illustrates an exemplary torque to position curve 200 in which the horizontal axis 202 represents a clutch pedal position and the vertical axis 204 represents the torque capacity of the clutch. The torque capacity being the amount of torque that may be transmitted by the clutch from the prime mover to the manual transmission. The shape of the torque to position curve 200 and values along that curve may be determined using one or more exemplary methods. For example, for lower pedal position values along the curve a calibration procedure may determine the shape by holding the vehicle stationary and releasing the clutch pedal while maintaining the engine at an idle speed. As the clutch starts to engage, the amount of engine torque that is required to maintain engine idle speed will gradually increase. Those values for engine torque may be reported from the engine control module and plotted on the graph of FIG. 2 as shown generally at 206. The torque capacity values for the higher pedal positions may be determined by depressing the clutch pedal while the vehicle is moving and detecting clutch slip. The engine torque values that are reported by the engine control module when clutch slip is detected may also be plotted on the graph of FIG. 2 as is generally illustrated at 208. The shape of the torque-to-position curve 200 may then be determined by any curve fitting techniques using the data points 206 and 208. Values along the torque-to-position curve 200 may then be selected and then stored in a torque-to-position table within the vehicle propulsion system. In this manner, the engine control module ECM may then adapt the engine torque based upon the actual capacity of the clutch based upon the torque capacity value from the torque-to-position table as the position of the clutch pedal changes. For example, the engine control module may proactively increase the engine torque as the clutch pedal position increases and vice-versa. The engine torque may be adjusted based upon the actual torque capacity of the clutch in accordance with the clutch pedal position.

While this torque-to-position curve may be initially determined and values along that curve may be stored in a torque-to-position table for use in controlling the engine torque, the present inventors realize that the actual torque capacity of a clutch may change over time. For example, the clutch may wear which may reduce the torque capacity of the clutch for any given clutch pedal position which may cause the torque-to-position curve to shift to the right in FIG. 2. Additionally, many clutches may have an adjustment feature which may compensate for the wear of the clutch. This adjustment may cause the torque-to-position curve to shift back to the left in FIG. 2. The present disclosure provides the ability to adjust the engine torque based upon changes and/or variations of the actual torque capacity of a clutch which may differ from that originally stored in a torque-to-position table.

The inventors understand that the amount of clutch torque that is actually available at any given time may be useful. For example, an accurate torque to position table for a clutch may enable improved engine torque control during a vehicle launch or for other operating conditions. For example, engine torque may be proactively increased in response to a change in clutch pedal position rather than waiting for the engine speed to sag before increasing torque. In this manner, engine torque may be optimized without having to correct for an engine speed sag.

In an exemplary embodiment of the present disclosure, a torque to position table may be adjusted based upon the actual performance of the clutch as detected during operation of the vehicle propulsion system. During driving an engine torque reported from an engine controller may be monitored as a clutch pedal is released and those data points may be stored for later reference.

Figure 3:
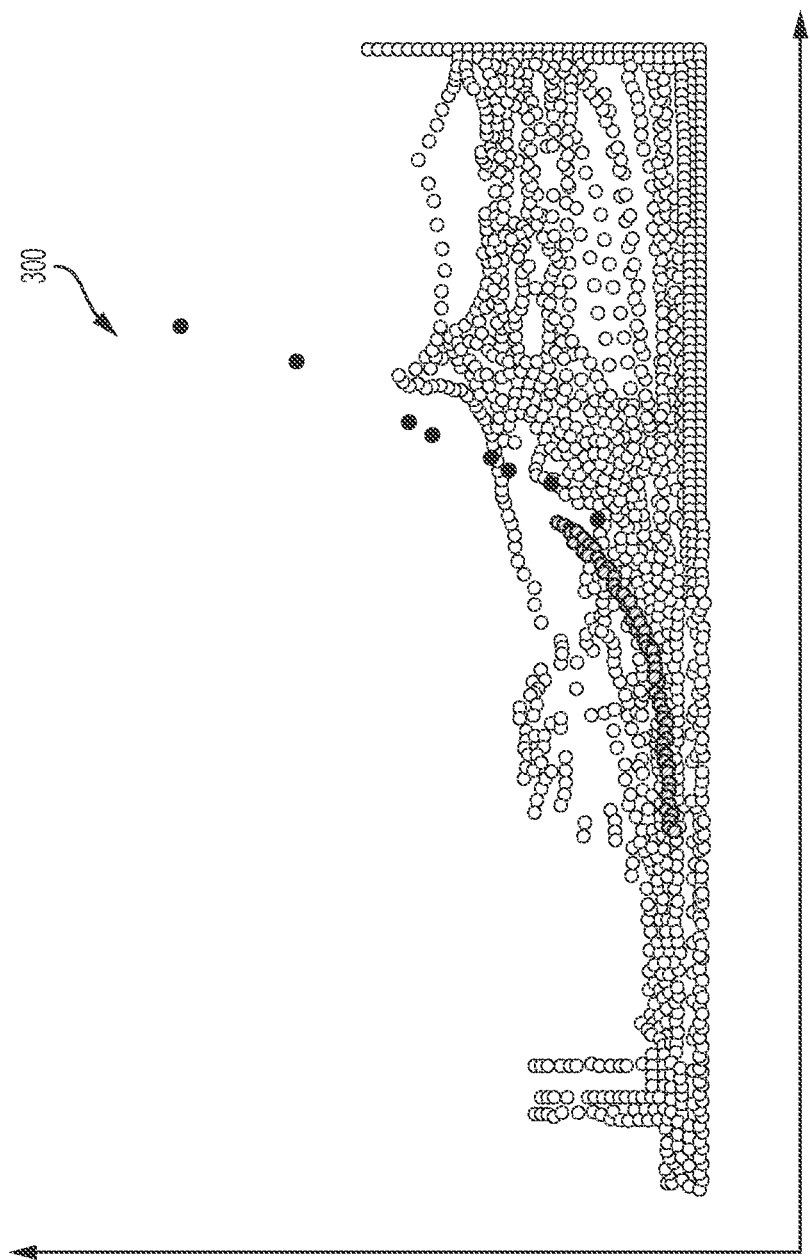
FIG. 3 illustrates a graph on which raw clutch torque to clutch pedal position data points are plotted.

In an exemplary embodiment, as the vehicle propulsion system operates as the vehicle is driven data representing clutch torque and clutch pedal position may be plotted 300 as illustrated in FIG. 3. However, as is clearly evident, these "raw" data points may not be useful in the absence of corrections and/or filtering.

In another exemplary embodiment, clutch torque to pedal position data points may be collected only when a clutch slip is detected. Clutch slip may be detected when a ratio between engine speed and the transmission output speed is higher than a predetermined gear ratio (for example, a highest gear ratio).

In another exemplary embodiment, because engine torque as reported by the engine controller may be slightly inaccurate, especially during transient conditions, such as, for example, throttle tip in, data points corresponding to conditions where engine torque is changing rapidly, and/or when an accelerator pedal position is changing rapidly, may be filtered out of the data. Preferably, data points are collected when conditions for the vehicle propulsion system are generally stable. Additionally, engine torque may also be corrected to compensate for engine inertia, which may further improve the quality of the torque to position data points.

In another exemplary embodiment, data points which may be clear outliers may also be further filtered out with simple processing.

Figure 4:
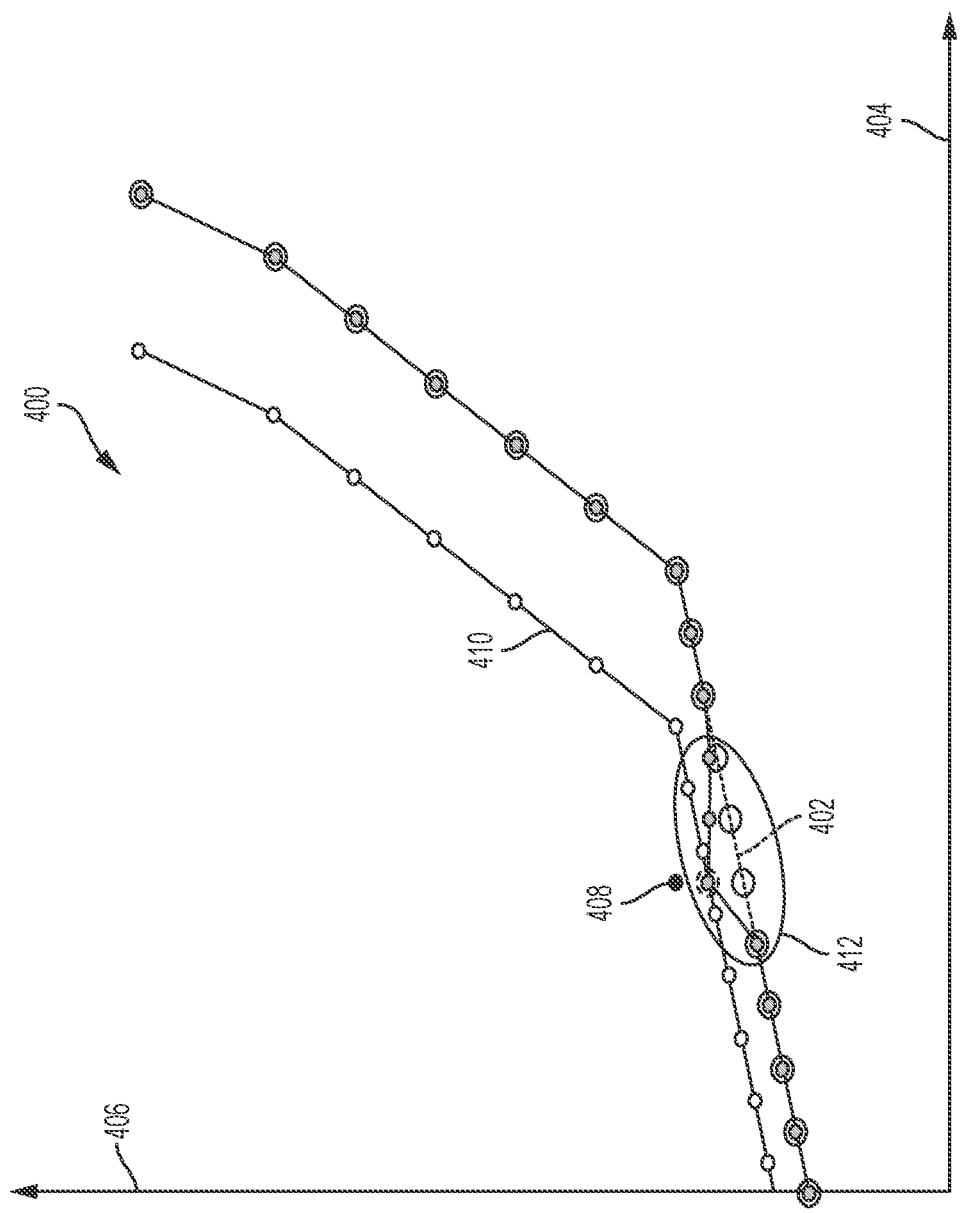
FIG. 4 is a graph illustrating exemplary methods for adjusting a clutch torque to clutch pedal position curve in accordance with the present disclosure.

FIG. 4 is a graph 400 illustrating two exemplary methods for adjusting a torque to position curve in accordance with the present disclosure. An initial torque to position curve 402 may be defined by a series of initial data plots of clutch torque and clutch pedal position. The horizontal axis 404 representing the relative clutch pedal position and the vertical axis 406 representing the clutch torque. A data point 408 representing data that was collected during operation of the vehicle propulsion system is plotted on the graph 400. In one optional embodiment, the torque to position curve 402 may be shifted about halfway between the original position of the torque to position curve 402 toward the data point 408 to form a second adjusted torque to position curve 410. Alternatively, only a portion of the torque to position curve 402 may be adjusted closer to the data point 408, as shown to provide an adjusted section 412 for the torque to position curve.

In this manner, the entire torque to position curve may be adjusted and the performance and efficiency of the vehicle propulsion system may be improved.

Figure 5:
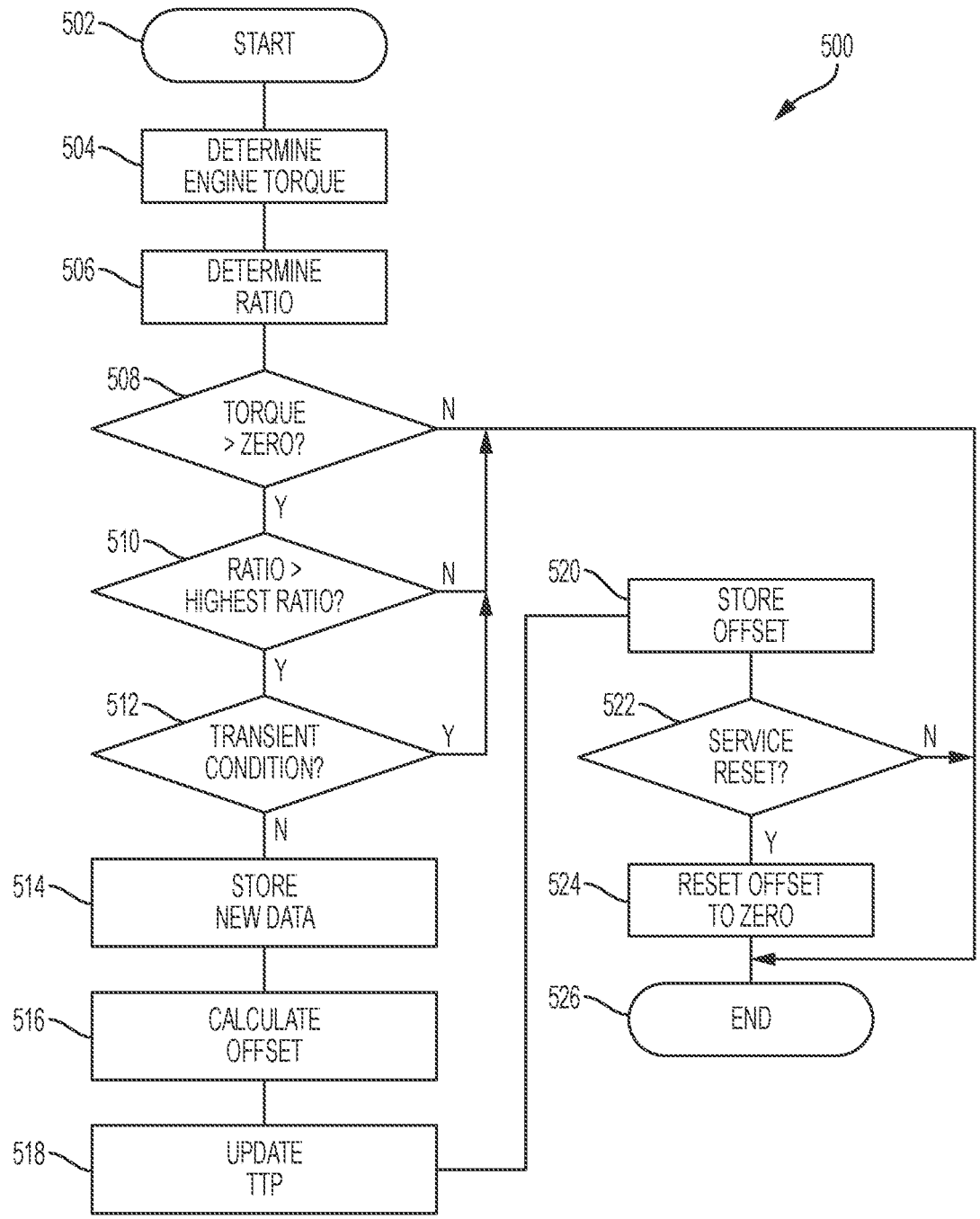
FIG. 5 is flowchart of a method for adjusting a clutch torque to clutch pedal position curve in accordance with the present disclosure.

FIG. 5 illustrates an exemplary flowchart 500 of a method in accordance with the present disclosure. The method starts at step 502 and continues to step 504. In step 504, the controller determines an engine torque and continues to step 506. In step 506, the controller determines the ratio between the engine speed and the transmission output speed and continues to step 508. In step 508, the controller determines whether the engine torque is greater than zero. If, in step 508, the controller determines that the engine torque is greater than zero then the method continues to step 510. If, however, in step 508, the controller determines that the engine torque is not greater than zero then the method jumps to step 526 where the method ends. In step 510, the controller determines whether the ratio of the engine speed to the transmission output speed is larger than a highest gear ratio for the transmission. If, in step 510, the controller determines that the ratio of the engine speed to the transmission output speed is larger than a highest gear ratio for the transmission then the method continues to step 512. If, however, in step 510, the controller determines that the ratio of the engine speed to the transmission output speed is not larger than a highest gear ratio for the transmission then the method jumps to step 526. In step 512, the controller determines whether the vehicle propulsion system is in a transient condition. If, in step 512, the controller determines that the vehicle propulsion system is in a transient condition, then the method jumps to step 526. If, however, in step 512, the controller determines that the vehicle propulsion system is not in a transient condition, then the method continues to step 514. In step 514, the controller records a new torque to position data point and continues to step 516. In step 516, the controller calculates offset data (which is intended to include single values, like an offset amount, and/or multiple values) based on the difference(s) between the current torque to position curve and a new torque to position curve based upon the new torque to position data point and continues to step 518. In step 518, the controller adjusts the torque to position curve based upon the offset data calculated in step 516. The method then continues to step 520 where the controller stores the offset data calculated in step 516. The method then continues to step 522. In step 522, the controller determines whether the vehicle propulsion system is undergoing a service reset. If, in step 522, the controller determines that the vehicle propulsion system is undergoing a service reset, then the method continues to step 524. If, however, in step 522, the controller determines that the vehicle propulsion system is not undergoing a service reset, then the method jumps to step 526. In step 524, the controller resets the offset data to zero. In other words, the torque to position curve is restored to its original position.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
 a transmission having manually selectable gear ratios;
 a manually operable clutch for selectively connecting the transmission to an engine for receiving torque from the engine and transmitting that torque through the transmission for propelling the vehicle;
 a clutch position sensor that generates a clutch position signal;
 a controller that is programmed to:
  receive the clutch position signal;
  determine an actual engine output torque;
  determine an actual clutch torque capacity value based upon the actual engine output torque and the clutch position signal;
  determine a difference between the actual clutch torque capacity value and a clutch torque capacity from a torque to position table corresponding to the clutch position signal;
  determine an adjusted clutch torque capacity based upon the determined difference; and
  control an operation of the engine based upon the adjusted clutch torque capacity.

2. The system of claim 1, further comprising:
 an engine speed sensor that outputs an engine speed signal on an input side of the manually operable clutch;
 a transmission output speed sensor on an output side of the manually operable clutch that outputs a transmission output speed signal, wherein the controller is further programmed to:
 receive the engine speed signal;
 receive the transmission output speed signal;
 determine a ratio between the engine speed signal and the transmission output speed signal; and
 determine if the ratio between the engine speed signal and the transmission output speed signal exceeds a predetermined threshold, and wherein the controller is programmed to determine the actual engine output torque when the ratio exceeds the predetermined threshold.

3. The system of claim 1, wherein the controller is further programmed to store a diagnostic code if the difference between the actual clutch torque capacity value and a clutch torque capacity from a torque to position table corresponding to the clutch position signal exceeds a predetermined threshold.

4. The system of claim 1, wherein the controller is further programmed to determine whether the vehicle propulsion system is experiencing a transient condition and wherein the controller does not determine an adjusted torque capacity during a transient condition.

5. The system of claim 1, wherein the controller is further programmed to:
 determine a rate of change of engine torque; and
 determine whether the rate of change of engine torque exceeds a predetermined threshold, wherein the controller determines that the vehicle propulsion system is experiencing a transient condition when the rate of change of engine torque exceeds the predetermined threshold.

6. A vehicle propulsion system, the system comprising:
 a transmission having manually selectable gear ratios;
 a manually operable clutch for selectively connecting the transmission to an engine for receiving torque from the engine and transmitting that torque through the transmission for propelling the vehicle;
 a clutch position sensor that generates a clutch position signal;
 a controller that is programmed to:
  receive the clutch position signal;
  determine a plurality of actual clutch torque capacity values based upon actual engine output torque values for each of a plurality of clutch position signal values;
  determine a difference between an actual clutch torque capacity value and a clutch torque capacity from a torque to position table corresponding to each of the plurality of clutch position signals; and
  determine an adjusted clutch torque capacity based upon the determined differences; and
  control an operation of the engine based upon the adjusted clutch torque capacity for each of the plurality of clutch position signals.

7. The system of claim 6, further comprising:
 an engine speed sensor that outputs an engine speed signal on an input side of the manually operable clutch;
 a transmission output speed sensor on an output side of the manually operable clutch that outputs a transmission output speed signal, wherein the controller is further programmed to:
 receive the engine speed signal;
 receive the transmission output speed signal;
 determine a ratio between the engine speed signal and the transmission output speed signal; and
 determine if the ratio between the engine speed signal and the transmission output speed signal exceeds a predetermined threshold, and wherein the controller is programmed to determine the plurality of actual engine output torque capacity values when the ratio exceeds the predetermined threshold.

8. The system of claim 6, wherein the controller is further programmed to store a diagnostic code if the difference between the actual clutch torque capacity value and a clutch torque capacity from a torque to position table corresponding to the clutch position signal exceeds a predetermined threshold.

9. The system of claim 6, wherein the controller is further programmed to determine whether the vehicle propulsion system is experiencing a transient condition and wherein the controller does not determine an adjusted torque capacity during a transient condition.

10. The system of claim 6, wherein the controller is further programmed to:
 determine a rate of change of engine torque; and
 determine whether the rate of change of engine torque exceeds a predetermined threshold, wherein the controller determines that the vehicle propulsion system is experiencing a transient condition when the rate of change of engine torque exceeds the predetermined threshold.

11. A method for controlling a vehicle propulsion system with a transmission having manually selectable gears, a manually operable clutch for selectively connecting the transmission to an engine for receiving torque from the engine and transmitting that torque through the transmission for propelling the vehicle, and a clutch position sensor that generates a clutch position signal, the method comprising:

receiving the clutch position signal;

determining an actual engine output torque;

determining an actual clutch torque capacity value based upon the actual engine output torque and the clutch position signal;

determining a difference between the actual clutch torque capacity value and a clutch torque capacity from a torque to position table corresponding to the clutch position signal;

determining an adjusted clutch torque capacity based upon the determined difference; and controlling an operation of the engine based upon the adjusted clutch torque capacity.

12. The method of claim 11, wherein the vehicle propulsion sensor further includes an engine speed sensor that outputs an engine speed signal on an input side of the manually operable clutch, and a transmission output speed sensor on an output side of the manually operable clutch that outputs a transmission output speed signal, the method further comprising:

receiving the engine speed signal;

receiving the transmission output speed signal;

determining a ratio between the engine speed signal and the transmission output speed signal; and determine if the ratio between the engine speed signal and the transmission output speed signal exceeds a predetermined threshold, wherein the method determines the actual engine output torque when the ratio exceeds the predetermined threshold.

13. The method of claim 11, further comprising storing a diagnostic code if the difference between the actual clutch torque capacity value and a clutch torque capacity from a torque to position table corresponding to the clutch position signal exceeds a predetermined threshold.

14. The method of claim 11, further comprising determining whether the vehicle propulsion system is experiencing a transient condition and wherein the method does not determine an adjusted torque capacity during a transient condition.

* * * * *